July 11, 1967   H. T. ADKINS ETAL   3,331,023
SENSING AND MEASURING DEVICE FOR HIGH VOLTAGE POWER LINES
Filed March 9, 1964   4 Sheets-Sheet 1

INVENTORS
HAROLD T. ADKINS
ROBERT H. PIERCE
BY
Moses, McGlew + Toren
ATTORNEYS

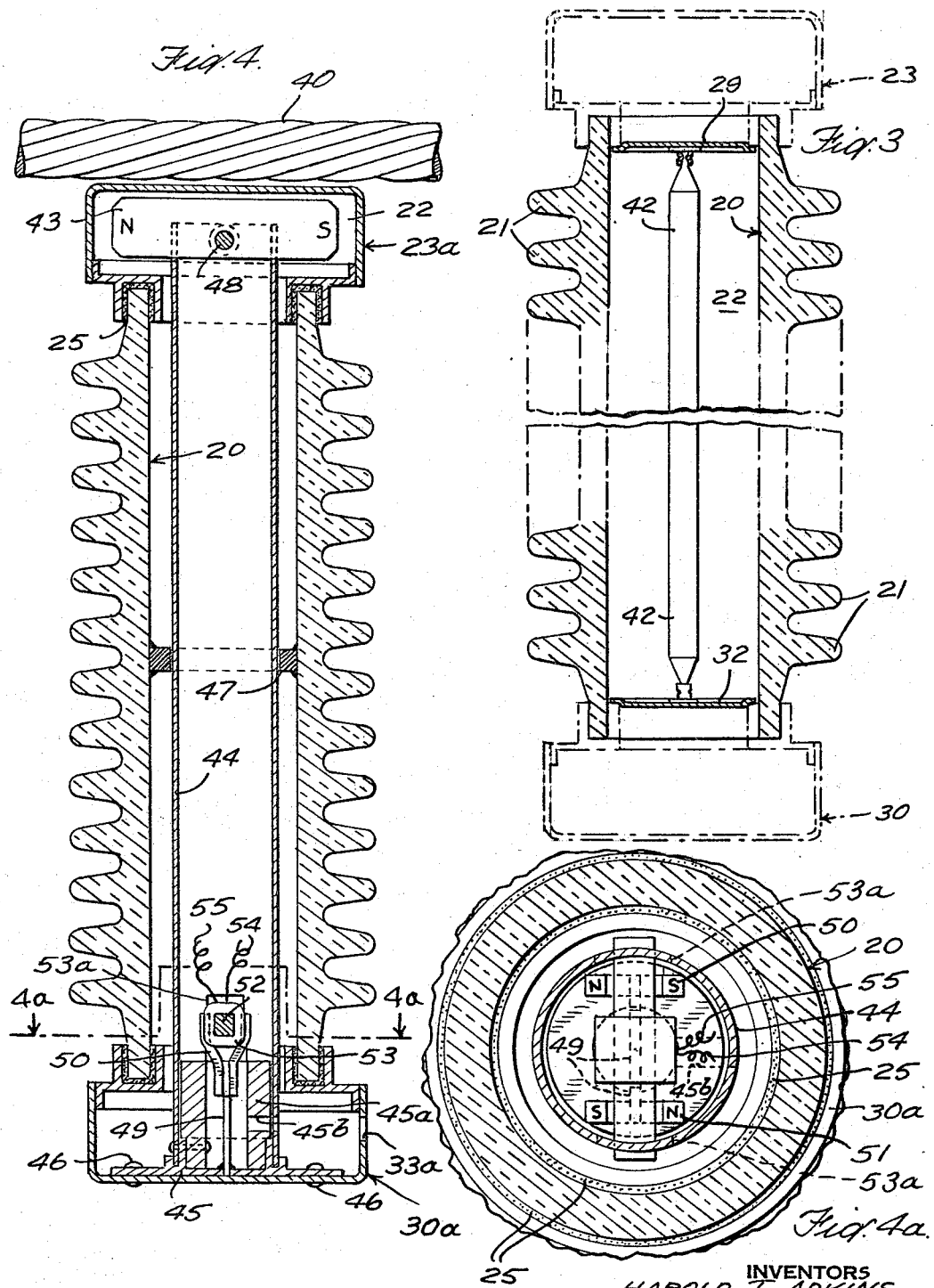

July 11, 1967 H. T. ADKINS ETAL 3,331,023
SENSING AND MEASURING DEVICE FOR HIGH VOLTAGE POWER LINES
Filed March 9, 1964 4 Sheets-Sheet 3

INVENTORS
HAROLD T. ADKINS
ROBERT H. PIERCE
BY
Moses, McGlew + Toren
ATTORNEYS

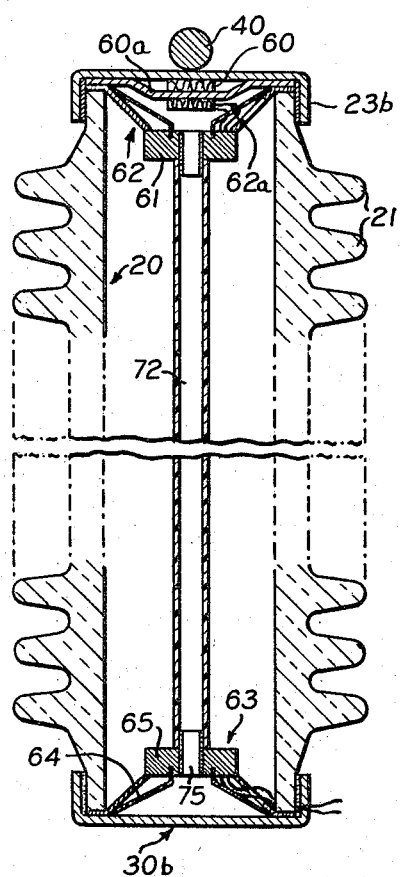

United States Patent Office 3,331,023
Patented July 11, 1967

3,331,023
SENSING AND MEASURING DEVICE FOR HIGH VOLTAGE POWER LINES
Harold T. Adkins, Hanover, and Robert H. Pierce, Duxbury, Mass., assignors to Sigma Instruments, Inc., Braintree, Mass.
Filed Mar. 9, 1964, Ser. No. 350,300
11 Claims. (Cl. 324—127)

This invention pertains, in general, to the sensing and measurement of currents and voltages; and, more particularly, to a new and improved sensing and measuring device wherein the changing magnetic field encircling a current carrying conductor of a high voltage power line is converted to vibratory or sonic energy which is transmitted through a dielectric medium to a remote part of the device so that the vibratory or sonic energy may be reconverted to other energy forms to enable safe measurement of the currents and voltages of the high voltage power line.

The current and voltage of high voltage power lines are usually determined by employing current transformers and voltage transformers. Such transformers may be permanently installed as when they are being used in power plants, electrical substations, and the like. Alternatively, such transformers may be portable so that they may be used in the field for determining the voltage and current of outside distribution lines. Due to capacitance and voltage stress effects, it is difficult to provide well insulated current or voltage sensing and measuring devices, wherein a device must not only be at ground potential, but must also be close to, or in contact with, a high voltage conductor. For safety reasons, it is required that such devices be thoroughly insulated from high voltage. However, it has not been practical to provide such devices which are thoroughly insulated from high voltage and yet provide an adequate and accurate reading of, or response to, the current and voltage in the high voltage conductor.

One object of the present invention is to provide a current sensing and measuring device which may be used safely with high voltage lines. In most cases, the device is embodied in an insulator which may be used also as one of the power line supporting insulators.

Another object of the present invention is to provide a current and voltage sensing and measuring device operating on a novel principle and having good insulation to high voltages without causing any loss in the accuracy of the readings, or responses, obtained.

According to one embodiment of the present invention, there is provided an elongated, hollow, insulator body. One end of the insulator body, called the "sensing" end, is intended to be placed in contact with or placed next to a conductor of a high voltage power line and may, as stated, constitute one of the power line supports. The other end of the insulator body, called the "output" end, is remote from the power line conductor. The output end of the insulator body is a part which may be contacted by operating personnel. Mounted in the sensing end of the insulator body is a pole piece structure, which is of a magnetically permeable material, such as "soft" iron or the like. Alternatively, it may be of a magnetically remanent material, such as a ferrite compound. Arranged adjacent to the pole piece structure is a diaphragm or armature of magnetically permeable material, such as, for example, "soft" iron. The diaphragm or armature is sometimes referred to, hereinafter, as the "transmitting diaphragm." Mounted at the output end of the insulator body is another diaphragm or armature of magnetically permeable material. This diaphragm at the output end is sometimes referred to as the "receiving diaphragm." Arranged next to the receiving diaphragm in the output end of the insulator body there is, according to one embodiment of the invention, a permanent magnet structure having a coil wound thereabout. As will be appreciated from the detailed description of the invention hereinafter appearing, the vibrations of the receiving diaphragm cause the coil, wound about the permanent magnet structure, to have a voltage induced therein which is proportional to the current in the power line conductor.

Operationally, the changing magnetic field encompassing the power line conductor, carrying a current of varying magnitude and/or varying polarity, is effective upon the pole piece structure and the transmitting diaphragm to cause the transmitting diaphragm, which acts like an armature, to vibrate. These vibrations are transmitted through a gas or fluid column in the hollow insulator body to the receiving diaphragm at the remote end of the insulator body. The vibrations of the receiving diaphragm or armature vary the reluctance of the magnetic circuit including the permanent magnet structure, thereby causing a voltage to be induced in the coil encompassing the permanent magnet structure. This induced voltage, which is proportional to the current in the power line conductor, may be used for the purpose of measuring or control, among other things, of the current and voltage of the power line.

Instead of using the fluid column which is in the hollow insulator body as a transmission medium for the vibrations of the transmitting diaphragm, other vibrations transmitting media may be employed. For example, according to one such embodiment, a tensioned string, or thread, of dielectric material is coupled between the transmitting diaphragm or armature and the receiving diaphragm or armature so that vibrations from the transmitting diaphragm, through the tensioned string, or thread, can cause vibrations of the receiving diaphragm.

Alternatively, according to another embodiment of the invention, a rod of dielectric material is connected between the transmitting and receiving diaphragms for the purpose of transmitting vibrations from the transmitting diaphragm to the receiving diaphragm.

According to another embodiment of the invention, there is mounted in the operative end of the hollow insulator body a permanent magnet instead of the pole piece structure and transmitting diaphragm hereinbefore described. Coupled with the permanent magnet is a tube of dielectric material which extends coaxially through the hollow insulator body from the sensing end to the output end of the insulator body. Operationally, the permanent magnet will rotate to a limited degree depending on the current flowing through the power line conductor to which, or near which, the sensing end of the insulator body containing the permanent magnet is placed. The rotation of the permanent magnet occasions a torsional oscillation of the dielectric tube about its longitudinal axis. At the output end of the tube there is arranged, instead of the permanent magnet structure and receiving diaphragm of the prior discussed embodiments, a transducer for converting the torsional oscillation of the dielectric tube into a signal which is usable for measuring the electrical characteristics of the power line conductor.

According to still another embodiment of the present invention, instead of employing the pole piece structure, diaphragms or armatures, permanent magnet structure, rod, tensioned thread, or torsion tube of the prior discussed embodiments, there is mounted in the sensing end of the hollow insulator body an induction coil which is arranged to have a voltage induced therein by a magnetic field of the power line conductor. Arranged near the induction coil and electrically connected therewith, is a loud speaker which converts the voltage signal induced in the induction coil into sonic energy which is transmitted through the fluid column within the hollow insulator body to the output end of the insulator body. At such end of the insulator body there is arranged a transducer which is capable of converting the sonic energy transmitted from the loud speaker into an electrical signal useful for determining the electrical characteristics of the power line conductor.

According to still another embodiment of the present invention, the operative end of the insulator body is provided with a hollow cap or closure member which is formed from an electrically conductive non-magnetizable material such as, for example, brass or aluminum or the like. Mounted in the sensing end of the insulator body near the cap there is a coil, both ends of which are electrically connected with the cap. A voltage will be induced in this coil due to the magnetic field encompassing a power line conductor adjacent to the cap. Arranged near the induction coil and electrically connected therewith is a loud speaker. As in the prior mentioned embodiment, the loud speaker converts the voltage signal induced in the induction coil into sonic energy which is transmitted through the fluid column within the hollow insulator body. At the output end of the insulator body there is arranged a suitable transducer for converting the sonic energy transmitted from the loud speaker into an electrical signal which will be proportional to the current flowing in the power line conductor. Also situated within the hollow insulator body is a capacitor means, one end of which is electrically connected with the cap in the operative end of the insulator body. The other end of the capacitor means is connected to ground potential. Means are provided for detecting the voltage across the capacitor means or a portion thereof. The voltage so detected provides a measure of the line-to-ground voltage of the power line conductor.

As may be appreciated from the foregoing brief descriptions of some of the various ways of embodying the invention, the output end of the subject sensing and measuring device is well isolated, electrically, from the sensing end of the device; the sensing end being in contact with, or proximate to, a high voltage power line conductor. In addition, the voltage stresses are well distributed over the entire length of the insulator body.

The various features of novelty which characterize the invention are pointed out with particularity in the claims annexed to and forming a part of this specification. For a better understanding of the invention, its operative advantages and specific objects attained by its use, reference should be had to the accompanying drawings and descriptive matter in which there are illustrated and described preferred embodiments of the invention.

In the drawings:

FIG. 3 is a sectioned elevation view, partly cut away, of the invention according to another embodiment thereof;

FIG. 4 is a sectioned elevation view of the invention according to another embodiment thereof;

FIG. 4a is a sectional view of FIG. 4 taken along the section 4a—4a; on an enlarged scale;

FIG. 9 is a sectioned elevation of another embodiment of the invention.

Figure 1:
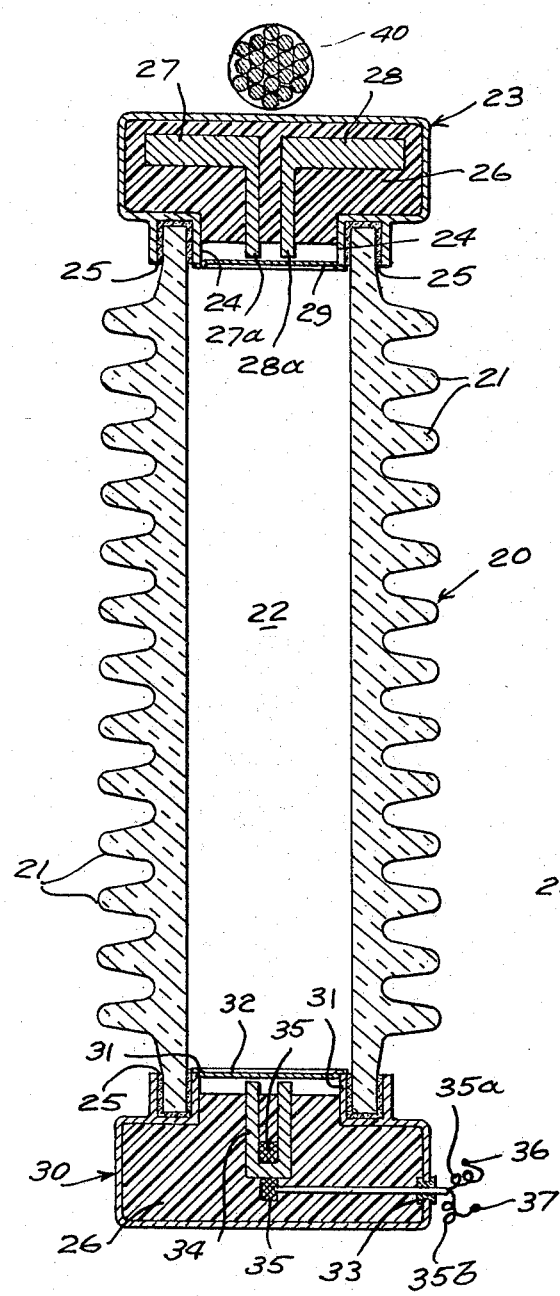
FIG. 1 is a sectioned elevation view of a sensing and measuring device according to one embodiment of the present invention.

According to the embodiment of the invention shown in FIG. 1, there is provided an elongated hollow insulator body 20. Around the outer peripheral surface of the insulator body 20 there are the integrally formed plurality of annular rings 21. The insulator body 20 having the integral annular rings 21 is like the conventional high voltage insulator bodies widely employed in electrical transmission and distribution systems. Extending from one end of the insulator body 20 to the other is the fluid-filled hollow space 22. Mounted on the operative end of the insulator body 20 is the cap 23 which is of non-magnetic metallic, or non-metallic, material. For example, the cap 23 may be formed from brass, or the like, or of a dielectric material, such as porcelain. As shown in FIG. 1, the cap 23 is provided with channel rim 24 which is intended to embrace the upper end of body 20 and extend into the hollow space 22. A cement 25 or other suitable sealing compound is used to bond the cap 23 to the operative end of the insulator body 20. Situated within the cap 23 and maintained in a matrix of a suitable dielectric potting compound 26, such as a hardened epoxy resin or the like, are the two pole pieces 27 and 28. As shown, the pole pieces 27 and 28 include the legs 27a and 28a, respectively, which extend downwardly from the pole pieces proper through the potting compound 26 a slight distance within the space within the rim 24. Both pole pieces 27, 28 and their respective legs 27a and 28a are formed from a magnetically permeable material such as "soft" iron, or the like. Alternatively, they may be of a highly resistive, magnetically remanent material such as any of the well known ferrite compounds.

A circular diaphragm or armature 29 (transmitting diaphragm) of a thin, magnetically permeable material, such as "soft" iron or the like, is bonded at its peripheral edge surface to the annular rim 24.

Advantageously, the cap 23 with its associated pole pieces 27 and 28 and the diaphragm 29 may be easily assembled prior to bonding the entire cap assembly to the sensing end of the insulator body 20. For example, the pole pieces 27 and 28 may be placed within the cap 23 with the legs 27a and 28a appropriately spaced apart. Thereafter, a suitable potting compound 26, initially in liquid form, may be poured into the cap 23. When the potting compound 26 hardens, the pole pieces 27 and 28 will be maintained in accurate alignment. Thereafter, the diaphragm 29 may be bonded to the edges of the rim 24; for example, by welding. Thus, the diaphragm-covered cap 23 containing the potted pole pieces 27 and 28 may, with a suitable cement 25, be fastened to the insulator body 20.

Another cap 30, similar to cap 23, is provided for the bottom, or output end of the insulator body 20. As shown, the cap 30 has formed therein an internal annular rim 31 which supports another diaphragm or armature 32 (receiving diaphragm) in the same manner as the transmitting diaphragm 29 is fastened to the annular rim 24 of cap 23. The circular diaphragm 32, like the diaphragm 29, may be of a magnetically permeable material such as, for example, "soft" iron. Also, the cap 30 may be fashioned from the same materials, hereinbefore set forth, from which the cap 23 is formed. As shown, the cap 30 is intended to be fastened, or otherwise suitably bonded, to the lower, or output end of the insulator body 20 by means of a suitable cement 25. The cap 30 includes an aperture which, when provided with a suitable bushing 33, serves to allow lead wires to be brought out from inside the cap 30. Mounted in a matrix of a suitable potting compound 26 is a coil-encompassed generally U-shaped permanent magnet 34. A coil 35 is wound around the permanent magnet 34 as shown. The coil leads 35a and 35b from the coil 35 extend outwardly through the potting compound 26 through the bushing 33 and are suitably terminated at the terminals 36 and 37.

When the sensing end of the insulator 20 which is terminated by the cap 23 is placed in contact with, or proximate to, a power line 40 carrying a varying current, the magnetic field encompassing the line 40 is introduced into the magnetic path associated with the cap 23. This path for the magnetic flux is comprised of the pole piece 27, leg 27a, an air gap, the transmitting diaphragm 29, another air gap, the leg 28a and the pole piece 28. As the current in the power line 40 varies, the magnetic field intensity and magnetic flux distribution changes accordingly. As a result, the diaphragm 29 which can flex away from, or toward, the legs 27a and 28a, vibrates. The vibrations in the transmitting diaphragm 29 are transmitted by the fluid in the hollow space 22 to the receiving diaphragm 32. As the receiving diaphragm 32 moves toward and away from the pole pieces of the U-shaped permanent magnet 34 due to the received vibrations, there occurs a change in the magnetic reluctance in the magnetic circuit defined by the permanent magnet 34 and the diaphragm 32. As a result, a signal voltage will be induced in the coil 35. This voltage signal will be representative of the current passing through the power line 40; the voltage signal being measured between the terminals 36 and 37.

Figure 2:
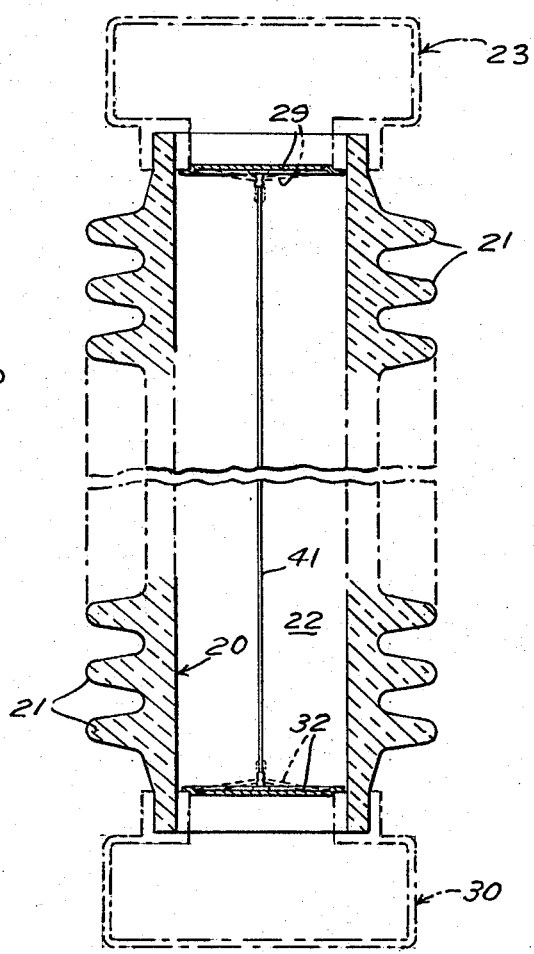
FIG. 2 is a sectioned elevation view of part of another embodiment of the device according to one invention.

In the embodiment of the invention shown in FIG. 2 there is included a pre-tensioned string or thread 41, having its ends fastened to the faces of the diaphragms or amatures 29 and 32. The string 41 may be of a suitable dielectric material such as a nylon or glass filament, or the like. In the sectioned view of FIG. 2, the end caps 23 and 30 and their internal components have not been shown in detail for purposes of clarity. As indicated, the pre-tensioned string 41 normally bows both the transmitting armature 29 and the receiving armature 32 toward each other as indicated by the dotted line representation. Advantageously, because these armatures 29 and 32 are directly linked by the string 41, the vibrations of the transmitting armature 29, in response to the magnetic flux through the pole pieces 27 and 28, will be transmitted to the receiving armature 32 very rapidly with low energy loss.

Another arrangement for enhancing high speed and low loss transmission of the vibratory energy between the diaphragms 29 and 32 is illustrated in FIG. 3. In FIG. 3, as in FIG. 2, the end caps 23 and 30 and their internal components have not been shown in detail. In FIG. 3, a rod 42 of dielectric material is fastened by suitable means to the faces of the transmitting armature 29 and the receiving armature 32. When magnetically excited by the pole pieces 27 and 28, the transmitting armature 29, rapidly and without substantial energy loss, sends the vibrations through the rod 42 to the receiving armature 32. A voltage signal is thereafter induced in a suitable coil such as 35 in the manner hereinbefore described.

Another embodiment of the current sensing device according to the present invention is illustrated at FIGS. 4 and 4a. In this arrangement, the sensing and output ends of the insulator body 20 are provided with caps 23a and 30a, respectively. The caps 23a and 30a are generally similar to the caps 23 and 30 shown in FIG. 1. Arranged within the space 22 of the insulator body 20 is a long dielectric tube 44. Suitably fastened to an end of the tube 44 is the end flange 45 which is fastened by screws 46 to the internal bottom surface of the cap 30a. As shown, the tube 44 extends from the flanged end 45 through an apertured slide bearing 47 which is permanent bonded to the internal wall of the insulator body 20 by means of a suitable cement, such as 25. The sleeve bearing 47 is a high dielectric material having a low friction coefficient with respect to the surface of the tube 44. The slide bearing 47 is necessary only on relatively long insulator bodies 20 or when using a tube 44 having a relatively small diameter. A material suitable for the slide bearing is glazed porcelain, or the like. At the end of the tube 44 that is situated within the end cap 23a, there are provided studs 48 which may be formed in the tip of the tube 44. A bar magnet 43 containing suitable apertures for receiving the studs 48 is rigidly fixed to the end of the tube 44. The longitudinal axis of the bar magnet 43, as indicated in FIG. 4, is intended to be parallel with the longitudinal axis of the power line 40. Suitable indicia, or a groove, may be placed or formed in, the top surface of the cap 23a for the purpose of making certain that the subject sensing device will be oriented properly so that the longitudinal central axes of the bar magnet 43 and the power line 40 are generally parallel, as indicated in FIG. 4. However, with current flow in the power line 40, the permanent magnet 43 will tend to rotate so as to try to align its longitudinal axis crosswise (in the magnetic field direction) to the longitudinal axis of the power line conductor 40. As the current in the power line 40 changes its magnetic field, correspondingly, changes its intensity and distribution. As a result, the bar magnet 43 will oscillate about the longitudinal central axis of the tube 44. The oscillations of the bar magnet 43 will set up torsional stresses and oscillations in the tube 44.

As shown in FIGS. 4 and 4a, one end of the tube 44 is affixed to the flange 45, as stated, and also fastened to the flange 45 is a cylindrical upright portion 45a which is suitably apertured as at 45b so that lead wires may be brought out therethrough into the cap 30a and outwardly through the aperture 33a therein. A bracket 49 situated within the cylinder 45a is fastened at one end thereof firmly to the flange 45. On top of the bracket 49 there are arranged, as may be appreciated from FIG. 4a, the two U-shaped permanent magnets 50 and 51. As shown in FIG. 4a, a magnetizable armature 52 protrudes through a coil 53 and the ends of the armature protrude through suitable apertures 53a in the tube 44. The coil leads 54 and 55 of the coil 53 are intended to be brought downwardly through the tube through the apertures 45b and 33a. As the oscillations of the permanent magnet 43 set up torsional stresses, the tube 44 oscillates, thereby oscillating the armature 52, which is coupled with the tube 44. Normally, the armature 52 is in the position indicated in FIG. 4a when no current flows through the power line 40. However, during oscillation of the tube 44 and the armature 52, the armature 52 is moved such that it is alternately in proximity with the north and south pole, respectively of the magnets 50 and 51. Then it is in proximity with the south and the north poles, respectively, of the magnets 50 and 51. Thus, alternately magnetic flux passes in different directions through the armature 52, thereby causing to be induced in the coil 53 an alternating voltage. This alternating voltage which appears across the leads 54 and 55 will be representative of the current passing through the power line 40.

Figure 5:
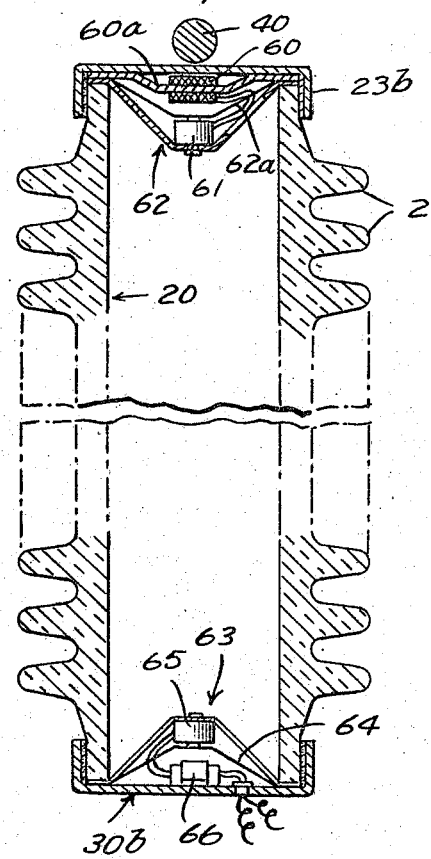
FIG. 5 is a sectioned elevation view, partly broken away, of the device of the present invention according to another embodiment thereof.

A further embodiment of the present invention is illustrated at FIG. 5. As shown, there is mounted within a cap 23b, which is similar to the cap 23 of FIG. 1, an induction coil 60 which has its longitudinal axis arranged crosswise of the power line conductor 40 from which it is to induce a voltage according to the variation of the magnetic field attending the current in the conductor. Voltages induced in the coil 60 are transmitted to the driving coil 61 of a loudspeaker 62 so that the movable diaphragm 62a thereof may convert the induced signal voltage into sonic energy. The core 60a of magnetic material, such as "soft" iron, may be directly connected to the cap 23b which may be brass or the like, the core 60a concentrating the magnetic flux path through the coil 60. At the output end of the insulator body 20 which is terminated with the cap 30b, which is similar to the cap shown at FIG. 1, there is mounted the transducer 63. The transducer 63 has a suitable diaphragm 64 associated therewith. The transducer 63 converts the received sonic energy transmitted from the loudspeaker 62 into an electrical signal in a driven coil 65 thereof. The signal from the driven coil 65 may be passed through an impedance matching transformer 66 and then, by suitable leads, out of the end cap 30b. The output signal from the impedance matching transformer 66 is representative of the electrical characteristics of the power line 40.

Figure 6:
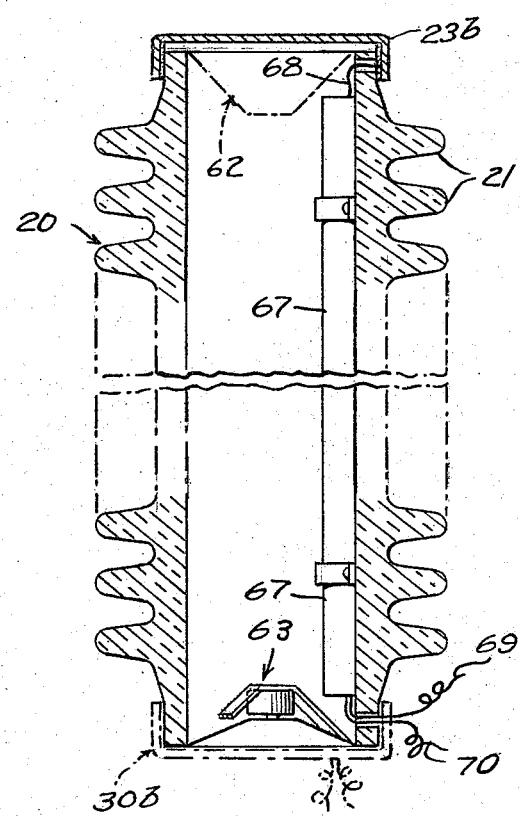
FIG. 6 is a sectioned elevation view partly broken away, of the device of the present invention according to another embodiment thereof.
Figure 7:
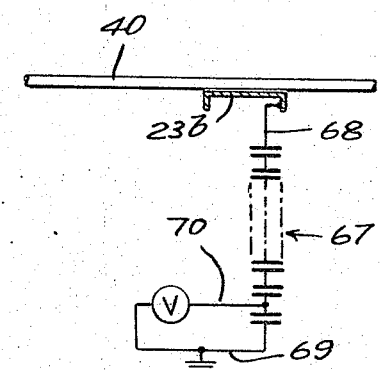
FIG. 7 is a schematic diagram showing the manner of connecting the capacitor indicated in FIG. 6.
Figure 8:
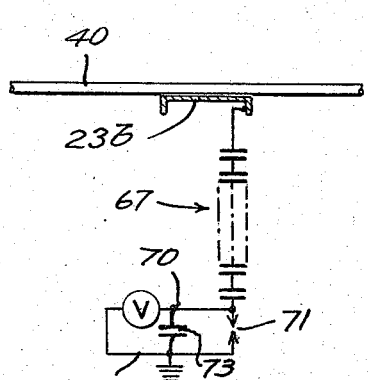
FIG. 8 is another schematic diagram showing another way of connecting the capacitor means shown in FIG. 6.

FIGS. 6, 7 and 8 are modifications of the arrangement of FIG. 5. In these FIGS. 6, 7 and 8, there is included within the hollow insulator body a capacitor or capacitors 67 in addition to speaker 62 and transducer 63 (FIG. 5). One lead 68 to the capacitors 67 is electrically connected directly to the electrically conductive end cap 23b. As a result, the voltage of a power line 40 will be impressed through lead 68 from the conductive end cap 23b to capacitor 67. At the opposite end of capacitors 67, two leads 69 and 70 are taken out through the lower end cap 30b through a suitable aperture therein. As shown in FIGS. 7 and 8, lead 69 is a grounded lead, whereas the lead 70 is a lead connected to a higher voltage point in the capacitors 67. For example, the lead 70 may be tapped at the last capacitor in a chain or series of capacitors forming the capacitor bank 67, as shown in FIG. 7. The volt meter V will give an indication of the fraction of line-to-ground voltage of the power line 40. The full actual line-to-ground voltage can then be found by multiplying the fractional voltage indicated by the volt meter by a factor depending upon the ratio of capacitances in the series arrangement comprising the capacitor 67. The alternative arrangement of FIG. 8, indicates that an external capacitor may be used for meter V, and an internal safety spark gap 71 may be provided at the end of the series of connected capacitors and the voltage thereacross determined by means of the volt meter V. Thus, in accordance with the arrangements shown at FIGS. 6, 7 and 8, the magnitudes of the current and voltage of the power line 40 may be determined. The second capacitor may be used to charge batteries, operate circuit breakers or other load, as well as serve as a spare voltage pickup and calibrating pickup.

A further modification of the pickup using loudspeakers is shown in FIG. 9. It was found that the efficiency (input to output) was increased by over an order of magnitude by coupling the sensing and output speakers in a push-pull arrangement. As shown in FIG. 9, the magnet structures 61 and 65 are made hollow, as shown at 75, and a plastic or dielectric insulating tube 72 has its ends secured in the hollows and interconnects both speakers. When the sensing cone moves down, the pressure wave proceeds in the annular space, between the tube 72 and the insulator body to exert a *push* force on the back of the output speaker. The reduced pressure on top of the sensing cone tends to draw fluid up inside tube 76 and pulls on the top of the output diaphragm. The efficiency is increased by virtue of the top of the cones not having to compress the gas in the small volume inside the concave side of the speaker.

While specific embodiments of the invention have been shown and described in detail to illustrate the application of the principles of the invention, it will be understood that this invention may be embodied otherwise without departing from such principles.

What is claimed is:

1. A device, for converting the magnetic energy of the current in a continuous and unbroken high voltage power line conductor into a signal, comprising: an elongated hollow insulator body having a fluid-filled space extending therethrough between opposite ends of said body, said elongated hollow insulator body having a first cap member fitted on an outer end forming a support surface to support said continuous and unbroken high voltage power line conductor extending transversely of such outer end whereby said body serves as a permanent insulating support for the conductor, a pair of magnetically permeable pole pieces mounted adjacent said cap member, a magnetically permeable first flexible armature mounted for vibration adjacent said cap member and having one surface thereof communicating with said space, said armature being vibrated by a changing magnetic field which encompasses the supported line conductor and extends through said pole pieces and armature, a second flexible armature mounted at the other end of said insulator body and having one face thereof in communication with said space, elongated and substantially rectilinear mechanical means extending substantially centrally longitudinally through said space and mechanically interconnecting said armatures for conjoint vibration, said second armature being vibrated by the vibration of said first armature as vibrations therefrom are received by said second armature when transmitted through said mechanical means in said fluid-filled space, and means responsive to the vibration of said second armature for producing a signal.

2. The device, according to claim 1, in which said mechanical means comprises, further a tensioned dielectric string situated in said space and having the ends thereof attached to the respective armatures and bowing said armatures toward each other.

3. The device, according to claim 1, in which said mechanical means comprises, further a dielectric rod situated in said space and having its ends attached to the respective diaphragms.

4. A device, for converting the magnetic energy of the current in a power line into a signal, comprising: an elongated hollow insulator body having a space extending therethrough between opposite ends of said body, a first cap member fitted to one open end of said body and a second cap member fitted to the opposite end of said body, a tube of dielectric material having one end thereof fastened to said second cap and extending through said space so the opposing end thereof is near said first cap member, a bar magnet mounted at said opposing end of said tube so that the longitudinal axis of said bar magnet is perpendicular to the longitudinal axis of said tube, said bar magnet being oscillatable in response to the changing magnetic energy of the power line to cause said tube to torsionally oscillate, and transducer means at said one end of said tube, responsive to the oscillation thereof, to produce a signal.

5. The device, according to claim 4, wherein said transducer means is comprised of a coil-encompassed magnetically-permeable pivoted bar member having its ends arranged for limited movement by oscillation of said tube, and stationary permanent magnet means arranged to pass magnetic flux in alternate opposing directions through said bar member as said bar member pivots toward and away from said permanent magnet means.

6. A device, for converting the magnetic energy of the current of a power line into a signal, comprising: an elongated insulator body having a space extending coaxially therethrough, means for closing both ends of said insulator body, an induction coil mounted in said space near one closed end of said body adapted to induce a voltage therein as the magnetic energy of the power line changes, a loudspeaker including a vibratable transmitting diaphragm and a driving coil for vibrating said transmitting diaphragm in response to signal voltages received from said induction coil, said loudspeaker being situated near said induction coil in said space, and another loudspeaker situated near the other closed end of said body in said space, said other loudspeaker including a vibratable receiving diaphragm and a driven coil for producing a signal in response to vibrations of said receiving diaphragm; and further comprising three terminal capacitor means having one terminal thereof adapted for electrical connection with the power line whereby the voltage across said capacitor's other two terminals is determinative of the line-to-ground voltage of said power line.

7. A device, for converting the magnetic energy of the current of a power line into a signal, comprising: an elongated insulator body having a space extending coaxially therethrough, means for closing both ends of said insulator body, an induction coil mounted in said space near one closed end of said body adapted to induce a voltage therein as the magnetic energy of the power line changes, a loudspeaker including a vibratable transmitting diaphragm and a driving coil for vibrating said transmitting diaphragm in response to signal voltages received from said induction coil, said loudspeaker being situated near said induction coil in said space, and another loudspeaker situated near the other closed end of said body in said space, said other loudspeaker including a vibratable receiving diaphragm and a driven coil for producing a signal in response to vibrations of said receiving diaphragm; and further comprising capacitor means for providing a signal determinative of the voltage between the power line and ground.

8. The device, according to claim 7, wherein said capacitor means comprises a plurality of series connected capacitors.

9. The device, according to claim 7, including a spark gap in series with the capacitor means.

10. The device, according to claim 9, in which there is an external capacitor means in parallel with the spark gap.

11. A device, for converting the magnetic energy of the current of a power line into a signal, comprising: an elongated insulator body having a space extending coaxially therethrough, means for closing both ends of said insulator body, an induction coil mounted in said space near one closed end of said body adapted to induce a voltage therein as the magnetic energy of the power line changes, a loudspeaker including a vibratable transmitting diaphragm and a driving coil for vibrating said transmitting diaphragm in response to signal voltages received from said induction coil, said loudspeaker being situated near said induction coil in said space, and another loudspeaker situated near the other closed end of said body in said space, said other loudspeaker including a vibratable receiving diaphragm and a driven coil for producing a signal in response to vibrations of said receiving diaphragm; there being a fluid connection from the end space outside of one diaphragm to end space outside of the other diaphragm so as to obtain a push-pull effect on the diaphragms, the loudspeaker magnet structures being hollow and the fluid connection between the hollows in the magnet structures comprising a tube passing through said axially extending space in the insulator.

References Cited

UNITED STATES PATENTS

| | | |
|---|---|---|
| 1,689,121 | 10/1928 | Ferdon. |
| 2,402,544 | 6/1946 | Foulds _____ 324—127 X |
| 2,403,232 | 7/1946 | Parisier _____ 179—1.6 |

FOREIGN PATENTS 1,346,244  11/1963  France.

NEIL C. READ, *Primary Examiner.*

D. MYER, *Assistant Examiner.*